(12) United States Patent
Klish et al.

(10) Patent No.: US 11,899,664 B2
(45) Date of Patent: Feb. 13, 2024

(54) COMPUTERIZED SYSTEM AND METHOD FOR OPTIMIZING QUERIES IN A TEMPLATED VIRTUAL SEMANTIC LAYER

(71) Applicant: YAHOO AD TECH LLC, New York, NY (US)

(72) Inventors: Aaron J. Klish, Savoy, IL (US); Jonathan Kilroy, Mahomet, IL (US); Moiz Arafat, Broadlands, VA (US); Rishi Agarwal, Herndon, VA (US)

(73) Assignee: YAHOO AD TECH LLC, New York, NY (US)

(*) Notice: Subject to any disclaimer, the term of this patent is extended or adjusted under 35 U.S.C. 154(b) by 66 days.

(21) Appl. No.: 17/399,520

(22) Filed: Aug. 11, 2021

(65) Prior Publication Data
US 2023/0053909 A1 Feb. 23, 2023

(51) Int. Cl.
| | |
|---|---|
| G06F 16/2453 | (2019.01) |
| G06F 16/25 | (2019.01) |
| G06F 11/34 | (2006.01) |
| G06F 16/242 | (2019.01) |
| G06F 16/2452 | (2019.01) |

(52) U.S. Cl.
CPC .... *G06F 16/24544* (2019.01); *G06F 11/3409* (2013.01); *G06F 16/2443* (2019.01); *G06F 16/2452* (2019.01); *G06F 16/256* (2019.01)

(58) Field of Classification Search
CPC .......... G06F 16/24544; G06F 16/2443; G06F 16/2452
See application file for complete search history.

(56) References Cited

U.S. PATENT DOCUMENTS

| | | | | |
|---|---|---|---|---|
| 5,991,762 | A * | 11/1999 | Nagarajayya | G06F 9/451 |
| 9,183,254 | B1 * | 11/2015 | Cole | G06F 16/2453 |
| 10,305,985 | B1 * | 5/2019 | Ma | G06F 16/24578 |
| 11,061,652 | B1 * | 7/2021 | Biswas | G06F 8/427 |
| 2005/0210002 | A1 * | 9/2005 | Pal | G06F 16/8358 |
| 2006/0129605 | A1 * | 6/2006 | Doshi | G06F 8/24 |
| 2007/0050347 | A1 * | 3/2007 | Johannes Maria Meijer | G06F 16/332 |
| 2007/0078823 | A1 * | 4/2007 | Ravindran | G06F 16/283 |
| 2007/0299834 | A1 * | 12/2007 | Liu | G06F 16/8365 |
| 2013/0060816 | A1 * | 3/2013 | Hui | G06F 16/86 707/E17.098 |
| 2016/0132304 | A1 * | 5/2016 | Bernelas | G06F 40/169 717/143 |
| 2018/0232404 | A1 * | 8/2018 | Bhatti | G06F 16/9024 |
| 2019/0294722 | A1 * | 9/2019 | Mohan | G06F 16/27 |
| 2020/0073983 | A1 * | 3/2020 | Sen | G06F 16/243 |
| 2022/0129451 | A1 * | 4/2022 | Haprian | G06F 16/252 |
| 2022/0147527 | A1 * | 5/2022 | Hartsing | G06F 16/2264 |
| 2022/0197917 | A1 * | 6/2022 | Schneuwly | G06N 20/00 |

* cited by examiner

*Primary Examiner* — Vaishali Shah
(74) *Attorney, Agent, or Firm* — James J. DeCarlo; Greenberg Traurig, LLP

(57) ABSTRACT

A novel framework optimizes SQL queries that are generated from a templated virtual sematic layer. The framework introduces the use of a virtual semantic layer into database management systems' operations, whereby templated SQL queries can be rewritten according to a determined and measured nesting, dimensional structure that produces an optimized search system. This enables templated SQL fragments to be translated for query optimization, thereby reducing the drain on a database's resources and minimizing a query's impact on the database's performance.

18 Claims, 7 Drawing Sheets

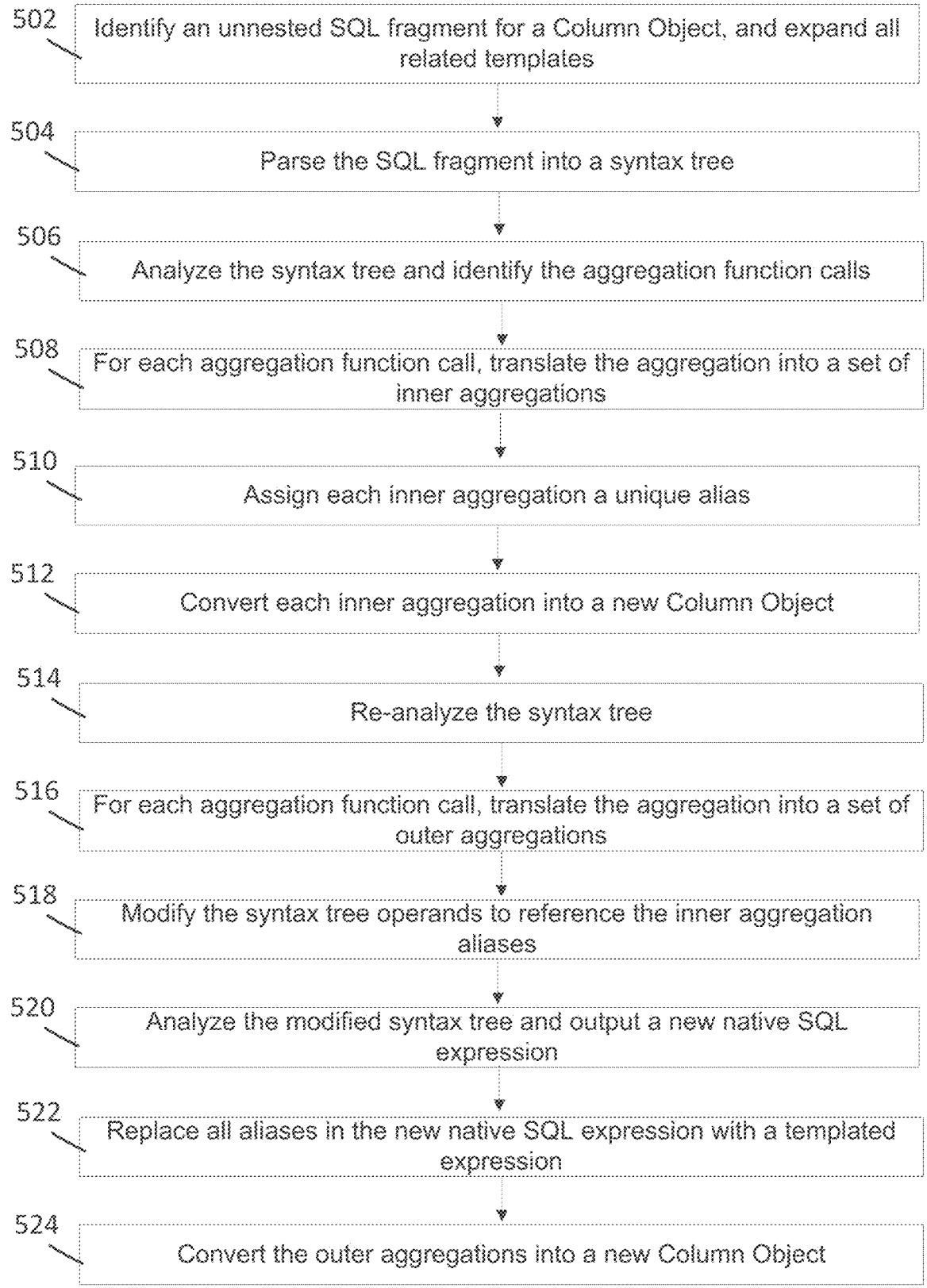

COMPUTERIZED SYSTEM AND METHOD FOR OPTIMIZING QUERIES IN A TEMPLATED VIRTUAL SEMANTIC LAYER

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to query optimization, and more particularly to providing a virtual semantic layer that uses templated Structured Query Language (SQL) to rewrite queries for purposes of optimization.

BACKGROUND

According to ANSI® (American National Standards Institute), SQL is the standard language for relational database management systems. SQL statements are used to perform tasks, such as, but not limited to, retrieve data from a database, update data on a database, and the like. The standard SQL commands such as "Select," "Insert," "Update," "Delete," "Create," and "Drop" can be used for most common and proprietary database systems.

SUMMARY

One of the functions of business intelligence tools and data analytic applications is to simplify data that is consumed and analyzed by end users. A primary mechanism to perform this is a semantic layer. Semantic layers present data as a set of tables with measures (e.g., numeric facts about data that can be aggregated) and dimensions (e.g., attributes that describe data). While tables, measures and dimensions are exposed through the semantic layer to users as simple names, they often map to complex formulas, functions, rules and queries that translate a complex physical model to the simpler semantic model.

In a virtual semantic layer, the translation between the complex physical and simple logical models can be performed at query time through a set of predefined rules. A representation of the rules is a set of predefined SQL fragments for the definition of tables, measures, dimensions and the relationships between tables (e.g., joins). In some embodiments, the semantic layer can stitch the fragments together into complete queries depending on the table and columns selected in a given client query. Because the queries are dynamic, the fragments can combine native SQL with templated variables for column and table names. As discussed in more detail below, the variables can be substituted by SQL generation logic with aliases that allow the logical models to construct more complex queries than the physical names would allow.

One of the challenges of any software system that generates SQL queries is writing and executing them in efficient forms. For example, for a query that requires a join and an aggregation, it may be more efficient to join before or after the aggregation depending on how sparse or dense the table join is. While query optimization has a long history in database design, query optimization becomes more challenging and complex with templated SQL fragments. Query optimization is often a multi-step process and templates must be preserved between steps to enable final translation.

The disclosed systems and methods provide a novel framework that optimizes SQL queries that are generated from a templated virtual semantic layer. As discussed in more detail below, the framework introduces the use of a virtual semantic layer into database management systems' operations, whereby templated SQL queries can be rewritten according to a determined and measured nesting, dimensional structure that produces an optimized search system. This enables templated SQL fragments to be translated for query optimization, thereby reducing the drain on a database's resources and minimizing a query's impact on the database's performance.

In accordance with one or more embodiments, the present disclosure provides computerized methods for a novel framework that optimizes SQL queries that are generated from a templated virtual sematic layer.

In accordance with one or more embodiments, the present disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., a client device) cause at least one processor to perform a method for a novel and improved framework that optimizes SQL queries that are generated from a templated virtual sematic layer.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 5 is a block diagram illustrating an exemplary data flow in accordance with some embodiments of the present disclosure.

DESCRIPTION OF EMBODIMENTS

Figure 1:
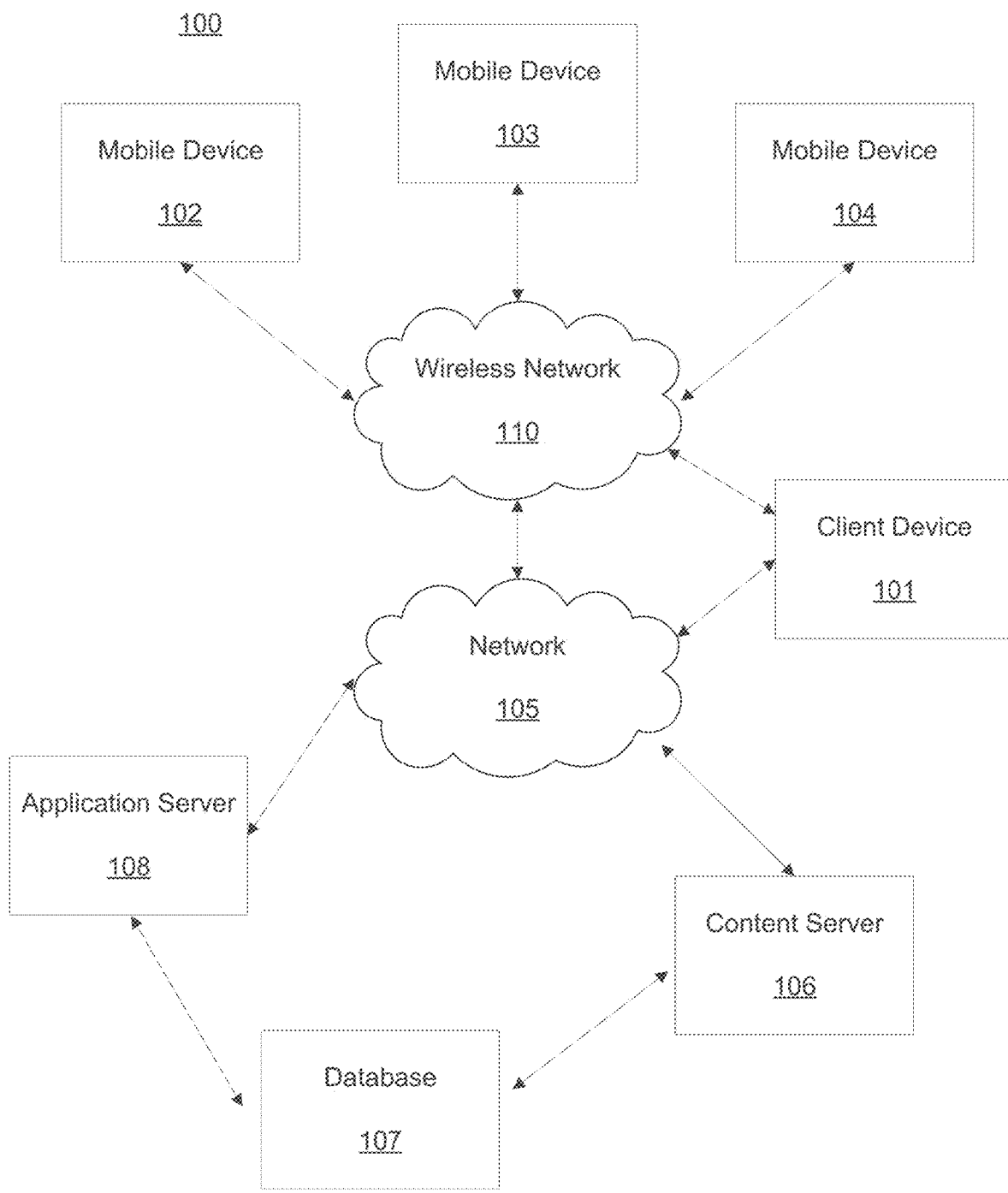
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106 and application (or "App") server 108.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like.

In some embodiments, content server 106 can be, or may be coupled or connected to, a third party server that stores online advertisements for presentation to users. In some embodiments, various monetization techniques or models may be used in connection with sponsored advertising, including advertising associated with user data, as discussed below, where ads can be modified and/or added to content based on the personalization of received content using the locally accessible user profile.

In some embodiments, users are able to access services provided by servers 106 and/or 108. This may include in a non-limiting example, search servers, authentication servers, email servers, social networking services servers, SMS servers, IM servers, MMS servers, exchange servers, photo-sharing services servers, and travel services servers, via the network 105 using their various devices 101-104.

In some embodiments, applications, such as, but not limited to, news applications, mail applications, instant messaging applications, blog, photo or social networking applications, search applications, and the like, can be hosted by the application server 108, or content server 106 and the like.

Thus, the application server 108 and/or content server 106, for example, can store various types of applications and application related information including application data and other various types of data related to the content and services in an associated database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106 and/or 108.

Moreover, although FIG. 1 illustrates servers 106 and 108 as single computing devices, respectively, the disclosure is not so limited. For example, one or more functions of servers 106 and/or 108 may be distributed across one or more distinct computing devices. Moreover, in one embodiment, servers 106 and/or 108 may be integrated into a single computing device, without departing from the scope of the present disclosure.

Figure 2:
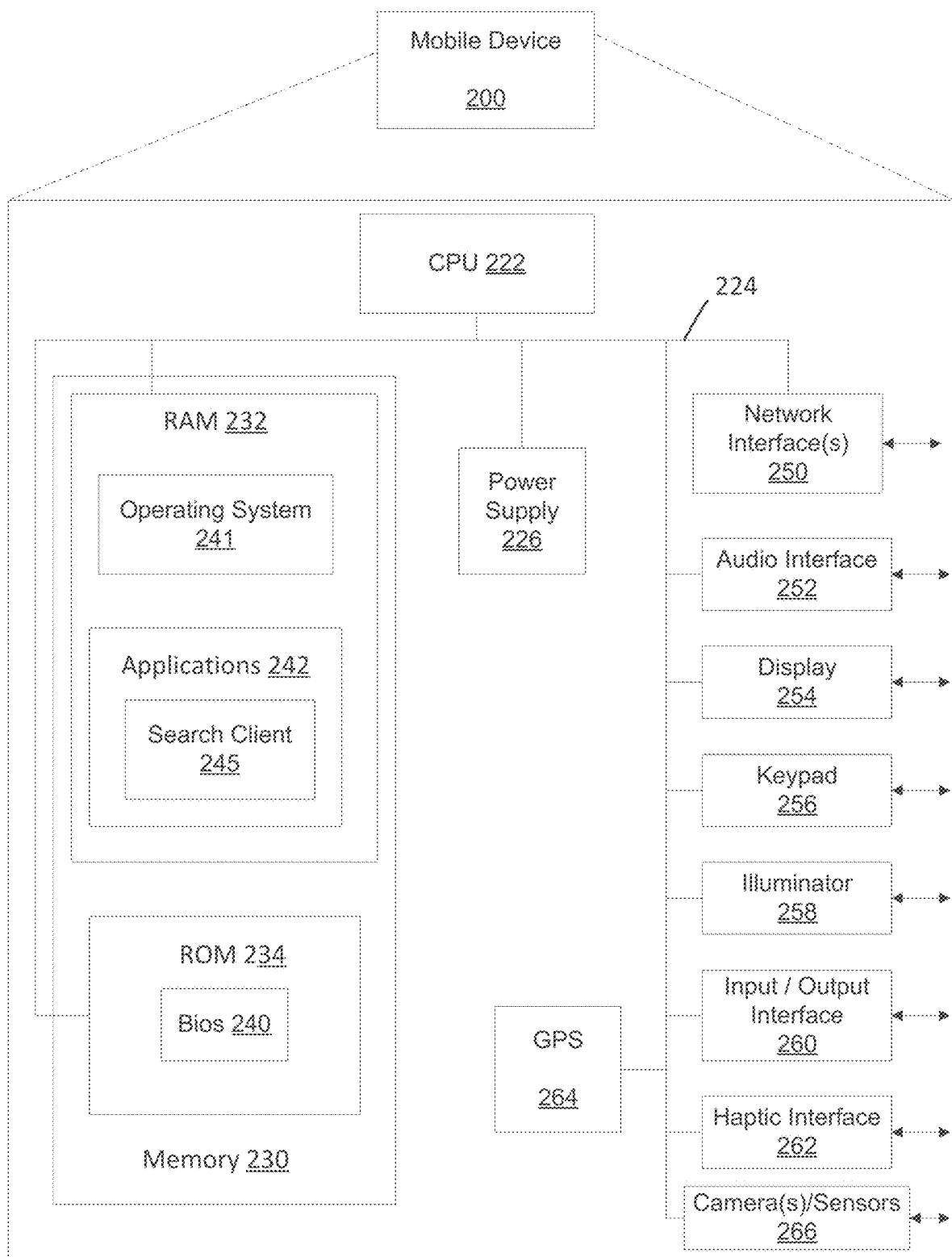
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices 101-104 discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 can be arranged to produce and receive audio signals such as, for example, the sound of a human voice. Display 254 can, but is not limited to, a include a touch sensitive screen arranged to receive input from an object such as a stylus or a digit from a human hand. Keypad 256 can comprise any input device arranged to receive input from a user. Illuminator 258 may provide a status indication and/or provide light.

Client device 200 also comprises input/output interface 260 for communicating with external devices. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth. In some embodiments however, Client device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below.

Figure 3:
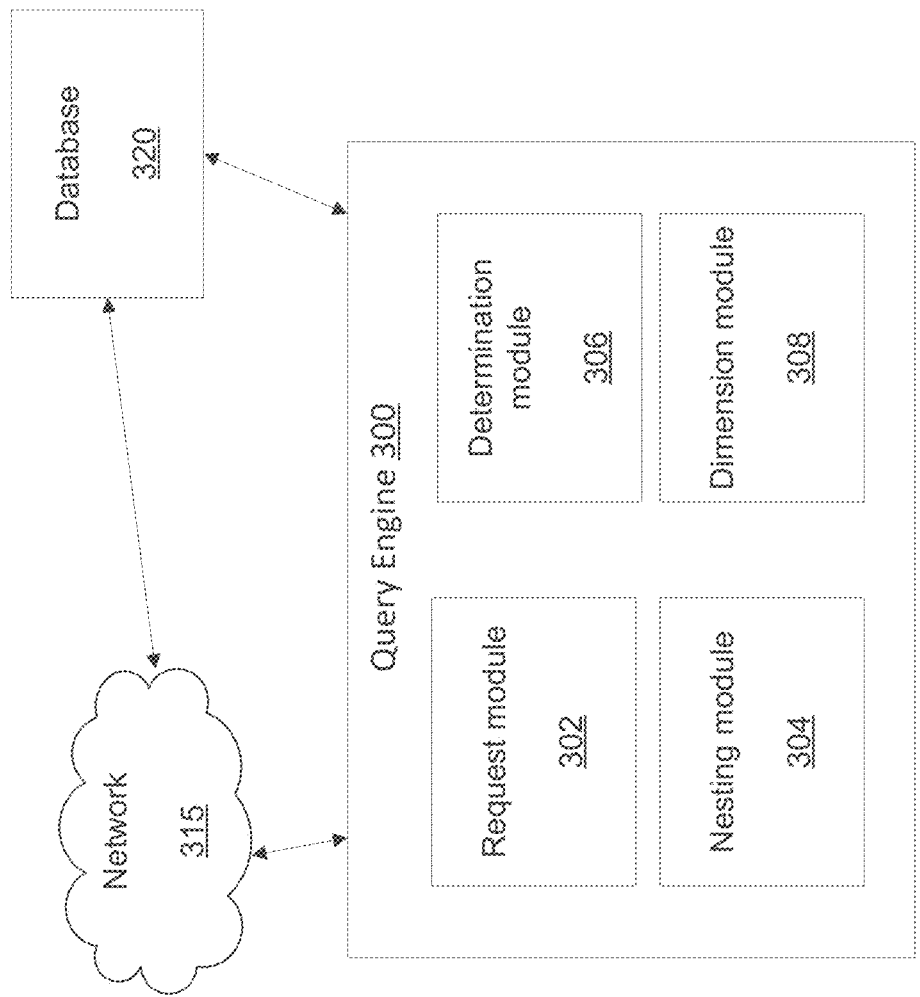
FIG. 3 is a block diagram illustrating components of an exemplary system in accordance with some embodiments of the present disclosure.

FIG. 3 is a block diagram illustrating the components for performing the systems and methods discussed herein. FIG. 3 includes query engine 300, network 315 and database 320. The query engine 300 can be a special purpose machine or processor and could be hosted by a network server (e.g., cloud web services server(s)), messaging server, application server, content server, social networking server, web server, search server, content provider, third party server, user's computing device, and the like, or any combination thereof.

According to some embodiments, query engine 300 can be embodied as a stand-alone application that executes on a networking server. In some embodiments, the query engine 300 can function as an application installed on the user's device, and in some embodiments, such application can be a web-based application accessed by the user device over a network. In some embodiments, the query engine 300 can be configured and/or installed as an augmenting script, program or application (e.g., a plug-in or extension) to another application or portal data structure.

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content, content and/or service providers, third party websites and the like.

In some embodiments, such information can be stored and indexed in the database 320 independently and/or as a linked or associated dataset. An example of this is look-up table (LUT). As discussed above, it should be understood that the data (and metadata) in the database 320 can be any type of information and type, whether known or to be known, without departing from the scope of the present disclosure.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the query engine 300, and the database of stored resources 320. Indeed, as illustrated in FIG. 3, the query engine 300 and database 320 can be directly connected by any known or to be known method of connecting and/or enabling communication between such devices and resources.

The principal processor, server, or combination of devices that comprise hardware programmed in accordance with the special purpose functions herein is referred to for convenience as query engine 300, and includes request module 302, nesting module 304, determination module 306 and dimension module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4:
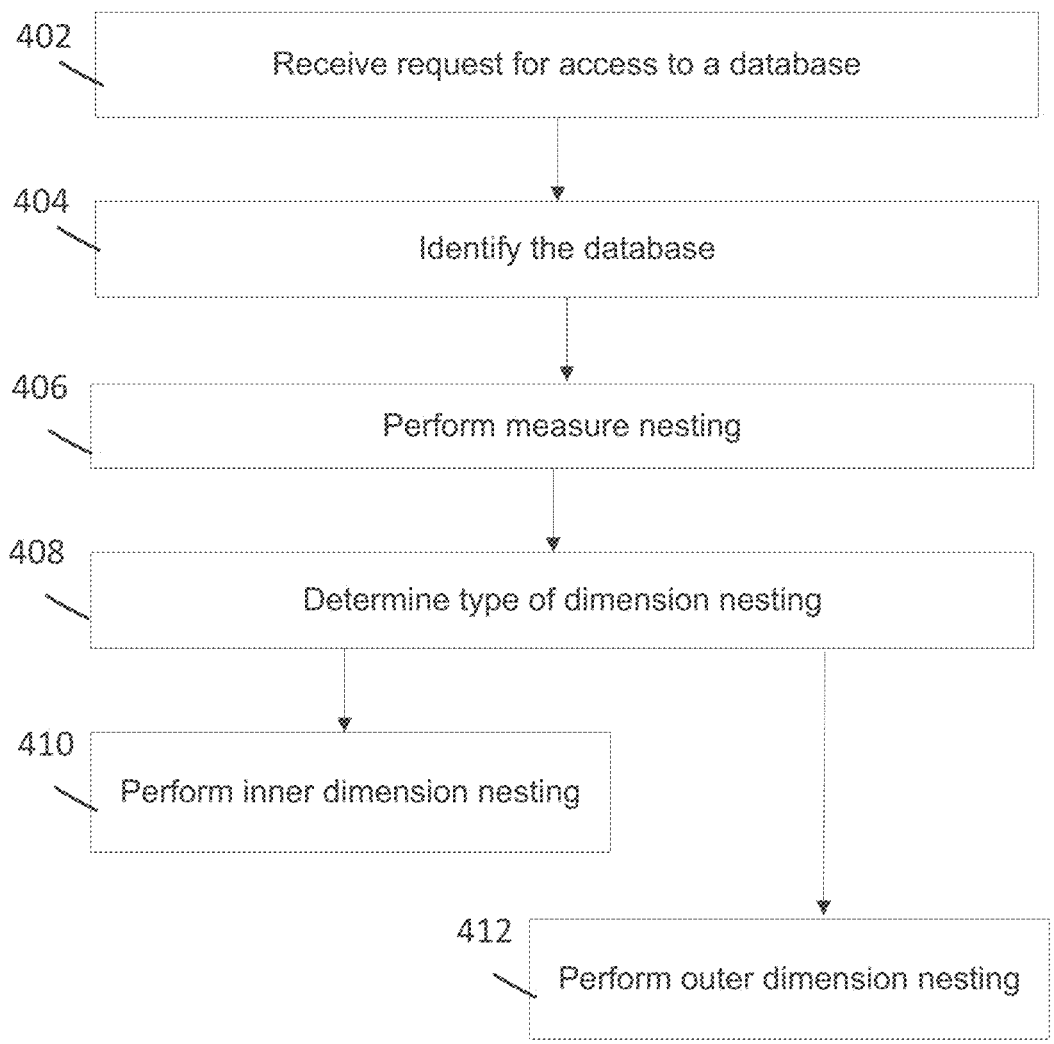
FIG. 4 is a block diagram illustrating an exemplary data flow in accordance with some embodiments of the present disclosure.

Turning to FIG. 4, Process 400 details non-limiting example embodiments for nesting templated SQL fragments to generate more efficient queries for a virtual semantic layer. Engine 300, as discussed below, performs query nesting to improve the performance of a database(s) operation(s), which as discussed above, can reduce resource drain while increasing efficiency in identifying the desired resource.

A nested query is a query which sources its columns from another query (e.g., a sub-query). There are multiple reasons to nest queries to make them more performant. In some embodiments, some measures may require nesting. For example, a measure of daily average users per week requires an inner query to compute a total number of users per day and an outer query to average that total per week. To make queries more efficient, engine 300 can combine multiple requested measures into a single query. If one measure does not require a nested query and another does, they can be combined by rewriting the unnested measure into an inner and outer aggregation.

In some embodiments, query aggregation before a join may require nesting that involves two passes of aggregation (e.g., both the inner and outer query aggregate). For example, if there is a filter on a column that requires a join, the inner query can aggregate over the join keys and the outer query can reaggregate removing the join keys while performing the final filter.

As discussed herein, following disclosure provides non-limiting example embodiments for mechanisms for nesting templated SQL fragments in order to generate more efficient queries for a virtual semantic layer.

According to some embodiments, Steps 402-404 of Process 400 are performed by request module 302 of query engine 300; Step 406 (and its sub-steps in FIG. 5) is performed by nesting module 304; Step 408 is performed by determination module 306; and Steps 410 and 412 (and their sub-steps in FIGS. 6A and 6B, respectively) are performed by dimension module 308.

Process 400 begins with Step 402 where a request to access a database is received. In some embodiments, the database includes a plurality of electronically stored information organized into columns and/or tables, as discussed above.

In some embodiments, this request can be in accordance with a search for or a request for an electronic resource stored in a database. In some embodiments, the request can be associated with a specific query and/or an overall configuration of query log information stored in a database. In some embodiments, this request can be based on an analysis or technician associated with a service or content provider requesting input to configure and/or inspect a database. In some embodiments, the requested database can be associated with a particular service and/or house/store particular types of data (e.g., click rates for advertising partners, and the like).

In Step 404, based on the request from Step 402, the database is identified. In some embodiments, the identification of the database can also enable access. For example, engine 300 may be granted write access (e.g., administrator privileges) to perform the disclosed measure nesting discussed below.

In Step 406, engine 300 performs measure nesting operations in conjunction with the information stored in the identified database. According to some embodiments, measure nesting operations are performed by a measure algorithm discussed below in detail in relation to FIG. 5, which outlines embodiments of sub-steps of Step 406.

In some embodiments, some aggregation functions are simple to nest. For example, the sum of user sessions in an unnested query can be rewritten as a sum of sessions in the inner query and the sum of sums in the outer query. In some embodiments, other aggregation functions are more complex. For example, the "average" function cannot nest without being first rewritten as the sum divided by a count. This form of rewrite requires parsing the native SQL into an abstract syntax tree before translating it. However, conventional native SQL parsers cannot parse templated SQL because the templates create invalid syntax. This requires a more advanced, multi-step algorithm, as discussed below in relation to FIG. 5.

According to some embodiments, there are broadly five kinds of template variables in the disclosed semantic layer: i) a logical column reference, ii) physical column references, iii) a logical join reference, iv) a physical join reference, and v) a column or table parameter reference.

In some embodiments, a logical column reference is a variable name that refers to another logical column in the semantic model. In some embodiments, the template can have the form: {{logicalName}}.

In some embodiments, a physical column reference is a variable name that refers to a physical database column. In some embodiments, the template can have the form: {{$physicalName}}, where the "$" denotes the physical database.

In some embodiments, a logical join reference is a variable name that refers to a logical column in a different semantic model that requires a table join to access. In some embodiments, the template can have the form {{joinName1.joinName2.logicalName}}.

In some embodiments, a physical join reference is a variable name that refers to a physical column in a different semantic model that requires a table join to access. In some embodiments, the template can have the form {{joinName1.joinName2.joinNameN.$physicalName}}.

In some embodiments, a column or table parameter reference can involve tables, measures and/or dimensions intaking and assigning user provided arguments. In some embodiments, the argument values can be substituted into the native SQL at query time. In some embodiments, the template can have the form: {{$$column.arg.argumentName}}.

According to some embodiments, every column (e.g., measure or dimension) can have a templated native SQL fragment, and every fragment can have one or more templated variables (referred to as "references"). By way of a non-limiting example, according to some embodiments of the disclosed systems and methods, a measure revenue per user can have an expression: (SUM({{$revenue}})*{{currencyRates.currentRate}})/SUM({{users}}).

In this example, the join currencyRates can have its own SQL ON clause expression: ON {{$currency_id}}={{currencyRates.$id}}.

According to some embodiments, this expression can be expressed as a tree of related references (referred to as a "reference tree"):

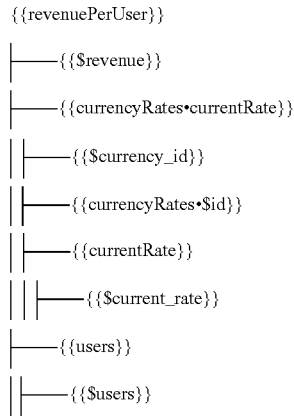

Turning now to FIG. 5, a non-limiting exemplary embodiment of the measure nesting, multi-step algorithm is disclosed. FIG. 5 provides Steps 502-524, which are sub-steps of Step 406 from FIG. 4.

According to some embodiments, the algorithm involves the performance of nesting, measure and dimension determinations. As discussed herein, the process of breaking a column in a query into 1 column in an outer query and 1 or more columns in an inner query is called nesting. Every measure and dimension can be represented as a Column Object (CO), which includes the column name, expression (native SQL fragment) and an alias.

In Step 502, engine 300 identifies an unnested SQL fragment for a CO, and fully expands all related templates. In some embodiments, the CO is an inner query that is unnested. For example, a column expression: SUM({{$revenue}}) can be translated into: SUM(revenueDb.revenue).

In Step 504, engine 300 parses the identified SQL fragment into a syntax tree. In some embodiments, the syntax tree can be an abstract syntax tree.

In Step 506, the syntax tree is analyzed, and as a result, the aggregation function calls included therein are identified.

In Step 508, for each identified aggregation (or aggregation function or aggregation function call, used interchangeably), engine 300 translates the aggregation into a set of inner aggregations. For example, the "average" function can translate into [SUM(operand), COUNT(operand)].

In Step 510, each inner aggregation is assigned a unique alias. In some embodiments, the assigned alias can include a 32 bit hash of the entire expression (for example: inner_agg_1234567).

In Step 512, each inner aggregation is converted into a new (or another) CO with its expression and the alias set from Steps 506-508, as discussed above.

In Step 514, engine 300 re-analyzes the syntax tree in a similar manner as discussed above in relation to Step 506. In some embodiments, Step 514 may not be required as Step 516 can be performed based off the analysis results from Step 506. In either embodiments, Step 514 results in the identification of aggregation function calls from the syntax tree.

In Step 516, for each aggregation function, engine 300 translates the aggregation into an outer aggregation. For example, the "average" function can translate into SUM(operand)/COUNT(operand).

In Step 518, the operands (or subexpression) in the syntax tree can be modified to reference the inner aggregation aliases (from Step 510). For example, the alias in the example from Step 510 can be modified as follows: SUM(inner_agg_1234567)/COUNT(inner_agg_1234567).

In Step 520, the modified syntax tree is analyzed, and as a result, a new native SQL expression is output (or generated).

In Step 522, engine 300 replaces all aliases in the new native SQL expression with a templated expression. In some embodiments, the templated expression can reference an alias like a physical column reference. For example, the templated expression can be as follows: SUM({{$inner_agg_1234567}})/COUNT({{$inner_agg_1234567}}).

And in Step 524, engine 300 converts the outer aggregations into a new CO. In some embodiments, the new CO includes the templated expression (from Step 522), and the alias is set to the original CO alias.

Turning back to Process 400 of FIG. 4, having completed the measuring nesting of Step 406, Process 400 proceeds to Step 408 where a determination is made regarding a type of dimension nesting to be performed by engine 300.

According to some embodiments, there are two algorithms for nesting dimensions depending on whether a referenced join needs to happen in the inner or outer query. Thus, in some embodiments, Step 408 can involve analyzing the database and/or the output from Step 406 (e.g., Steps 502-524 of FIG. 5) and determining where a referenced join needs to occur.

In some embodiments, if the referenced join should happen on the inner query, or there is no join required (e.g., a referenced join does not exist), Process 400 proceeds from Step 408 to Step 410 where inner dimension nesting is performed by engine 300.

Figure 6A:
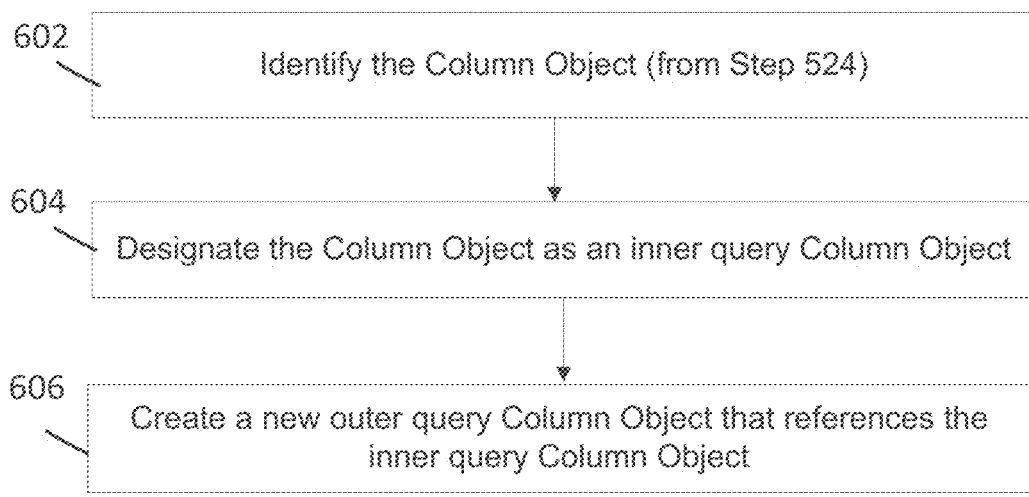
FIGS. 6A-6B are block diagrams illustrating exemplary data flows in accordance with some embodiments of the present disclosure.

Turning to FIG. 6A, Steps 602-606 are detailed, which are sub-steps of Step 410's inner dimension nesting. In Step 602, the CO from Step 524 is identified. Then, in Step 604, the identified CO is designated as an inner query CO. Then, in Step 606, engine 300 creates a new outer query CO that references the inner query CO. In some embodiments, the inner query CO can be referenced by the new outer query CO through a template expression: {{$columnAlias}}.

Turning back to FIG. 4, in some embodiments, if it is determined that a referenced join needs to happen in the outer query, Process 400 proceeds from Step 408 to Step 412 where outer dimension nesting is performed by engine 300.

Figure 6B:
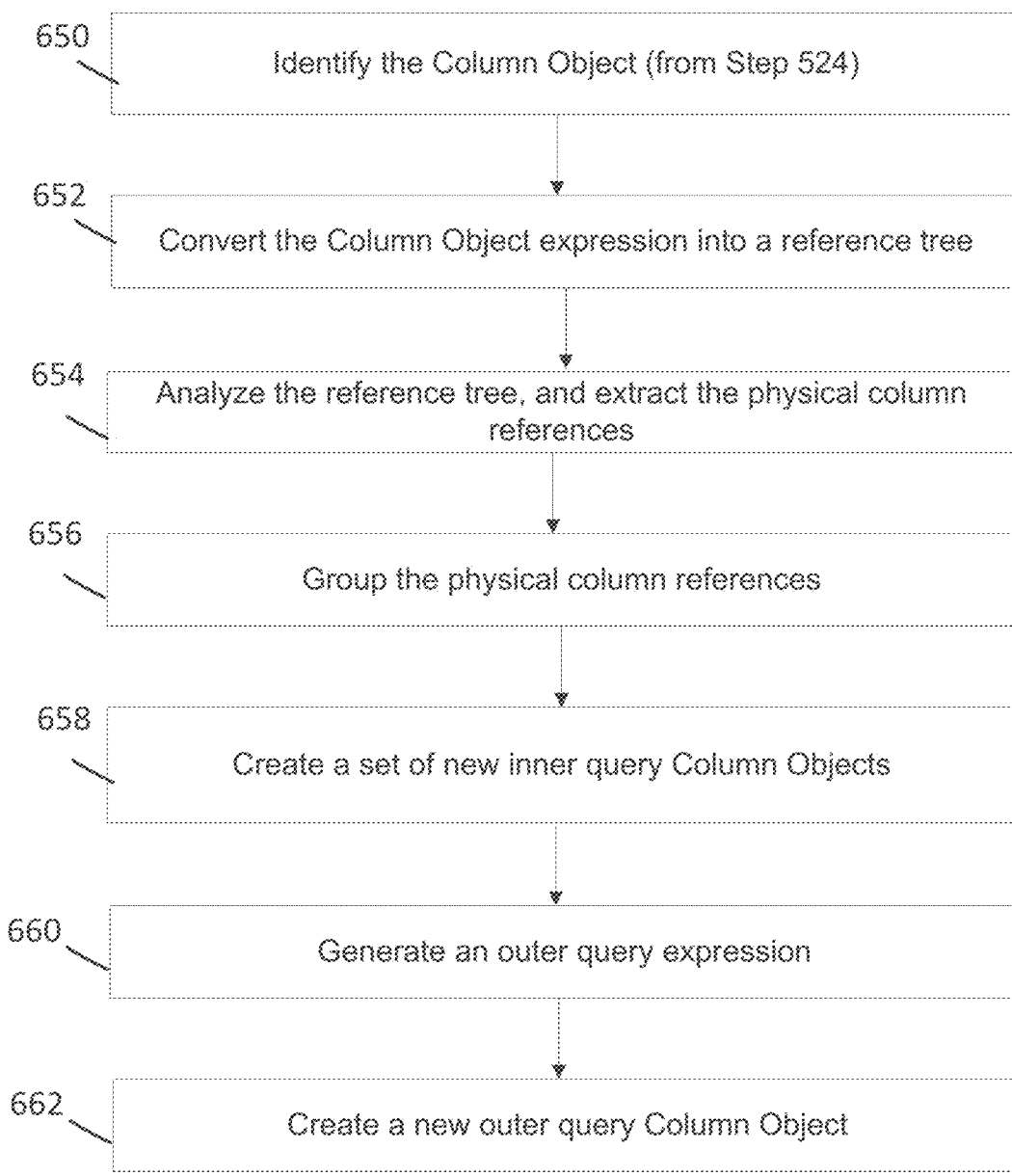

Turning to FIG. 6B, Steps 650-662 are detailed, which are sub-steps of Step 412's outer dimension nesting. According to some embodiments, the outer dimension nesting discussed herein may require the initial identification (or projection) of the join columns in the inner query that are needed to perform the outer query joins. As a result of the subsequent processing of Steps 650-662, the projected join columns can be dropped in the outer query aggregation.

In Step 650, the CO from Step 524 is identified. In Step 652, engine 300 converts the expression of the identified CO into a reference tree, as discussed above.

In Step 654, the reference tree is analyzed, and as a result, the physical column references are extracted. The physical column references belong to the identified CO's physical table, and joins to other tables can be excluded, in some embodiments).

In Step 656, the physical column references are grouped. For example, such grouping can be executed by a "GROUP BY" statement in SQL. In some embodiments, the grouping is based on the inner aggregation query and is made available to the outer query.

In Step 658, engine 300 creates a new set of inner query COs for each grouping. In some embodiments, the new set of inner query COs can be for each physical column reference in a group, or for each group, and applied to each physical column reference within a group. Thus, in Step 658, the CO expression is set to a templated expression that references a physical column: {$physicalColumnName}}.

In Step 660, engine 300 generates an outer query expression. In some embodiments, Step 660 involves engine 300 crafting the outer query expression by partially resolving the template variables in the CO expression. In some embodiments, all physical column references can be resolved except the physical column references that are not substituted.

And, in Step 662, engine 300 creates a new outer query CO. In some embodiments, the new outer query CO has an expression set to the generated outer query expression from Step 660, and an alias set to the original CO alias.

Turning back to FIG. 4, the steps and sub-steps of Process 400 enables any column (e.g., measure or dimension) to be nested, and nested repeatedly. Such nesting enables query optimization by placing joins at the most appropriate query level. Moreover, the disclosed nesting of Process 400 uses a simplified semantic layer for measures that require multiple levels of nesting, which is also a powerful semantic layer through its support of both nested and templated expressions.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
identifying, by a device, a database comprising a plurality of information organized into at least a set of columns;
identifying, by the device, a Column Object (CO) within a column of the database, the CO comprising information related to a column name, a Structured Query Language (SQL) expression and an alias;
expanding, by the device, templated fragments associated with the SQL expression of the identified CO;
parsing, by the device, each of the expanded templated fragments of the SQL expression, and determining a syntax tree of the SQL expression from the expanded templated fragments;
analyzing, by the device, the syntax tree of the SQL expression;
creating, by the device, based on the analysis, a new CO related to the identified CO, the new CO comprising information related to the column name, a templated expression of the SQL expression and the alias, the creation of the new CO comprising:
identifying an unnested SQL fragment associated with the CO;
parsing the unnested SQL fragment into the syntax tree;
analyzing the syntax tree, and identifying aggregation function calls;
translating each identified aggregation function call into a set of inner aggregations;
assigning each inner aggregation function a unique alias;
converting each inner aggregation into another CO;
translating each aggregation function call into a set of outer aggregations;
modifying operands of the syntax tree to reference the unique aliases;
analyzing the modified syntax tree and generating a new native SQL expression;
replacing aliases in the new native SQL expression with the templated expression; and
converting the outer aggregations into the new CO;
analyzing, by the device, information related to the new CO, and determining a type of dimension nesting, the type of dimension nesting being based on whether a referenced join is to occur as an inner query or outer query; and performing, by the device, the determined type of dimension nesting.

2. The method of claim 1, wherein the unnested SQL fragment at least corresponds to the expression of the CO.

3. The method of claim 1, further comprising:
determining, based on the analysis of the new CO information, that the type of dimension nesting is inner dimension nesting.

4. The method of claim 3, further comprising:
identifying the new CO;
designating the new CO as an inner query CO; and
creating a new outer query CO that references the inner query CO.

5. The method of claim 3, wherein the referenced join is to occur as the inner query.

6. The method of claim 1, further comprising:
determining that the referenced join does not exist in relation to the new CO; and
determining that the type of dimension nesting is inner dimension nesting.

7. The method of claim 1, further comprising:
determining, based on the analysis of the new CO information, that the type of dimension nesting is outer dimension nesting, wherein the referenced join is to occur as the outer query.

8. The method of claim 7, further comprising:
identifying the expression of the new CO;
converting the expression into a reference tree;
analyzing the reference tree, and extracting physical column references;
grouping the physical column references;
creating a set of new inner query COs for each grouping, each new inner query CO being set to a second templated expression that references a physical column;
generating an outer query expression by at least partially resolving template variables of the second templated expression of the new CO; and
creating a new outer query CO that includes the outer query expression and the alias.

9. A non-transitory computer-readable storage medium tangibly encoded with computer-executable instructions, that when executed by a processor associated with a device, performs a method comprising:
identifying, by the device, a database comprising a plurality of information organized into at least a set of columns;
identifying, by the device, a Column Object (CO) within a column of the database, the CO comprising information related to a column name, a Structured Query Language (SQL) expression and an alias;
expanding, by the device, templated fragments associated with the SQL expression of the identified CO;
parsing, by the device, each of the expanded templated fragments of the SQL expression, and determining a syntax tree of the SQL expression from the expanded templated fragments;
analyzing, by the device, the syntax tree of the SQL expression;
creating, by the device, based on the analysis, a new CO related to the identified CO, the new CO comprising information related to the column name, a templated expression of the SQL expression and the alias, the creation of the new CO comprising:
identifying an unnested SQL fragment associated with the CO;
parsing the unnested SQL fragment into the syntax tree;
analyzing the syntax tree, and identifying aggregation function calls;
translating each identified aggregation function call into a set of inner aggregations;
assigning each inner aggregation function a unique alias;
converting each inner aggregation into another CO;
translating each aggregation function call into a set of outer aggregations;
modifying operands of the syntax tree to reference the unique aliases;
analyzing the modified syntax tree and generating a new native SQL expression;
replacing aliases in the new native SQL expression with the templated expression; and
converting the outer aggregations into the new CO;
analyzing, by the device, information related to the new CO, and determining a type of dimension nesting, the type of dimension nesting being based on whether a referenced join is to occur as an inner query or outer query; and
performing, by the device, the determined type of dimension nesting.

10. The non-transitory computer-readable storage medium of claim 9,
wherein the unnested SQL fragment at least corresponds to the expression of the CO.

11. The non-transitory computer-readable storage medium of claim 9, further comprising:
determining, based on the analysis of the new CO information, that the type of dimension nesting is inner dimension nesting.

12. The non-transitory computer-readable storage medium of claim 11, further comprising:
identifying the new CO;
designating the new CO as an inner query CO; and
creating a new outer query CO that references the inner query CO.

13. The non-transitory computer-readable storage medium of claim 9, further comprising:
determining, based on the analysis of the new CO information, that the type of dimension nesting is outer dimension nesting, wherein the referenced join is to occur as the outer query.

14. The non-transitory computer-readable storage medium of claim 13, further comprising:
identifying the expression of the new CO;
converting the expression into a reference tree;
analyzing the reference tree, and extracting physical column references;
grouping the physical column references;
creating a set of new inner query COs for each grouping, each new inner query CO being set to a second templated expression that references a physical column;
generating an outer query expression by at least partially resolving template variables of the second templated expression of the new CO; and
creating a new outer query CO that includes the outer query expression and the alias.

15. A device comprising:
a processor configured to:
identify a database comprising a plurality of information organized into at least a set of columns;

identify a Column Object (CO) within a column of the database, the CO comprising information related to a column name, a Structured Query Language (SQL) expression and an alias;

expand templated fragments associated with the SQL expression of the identified CO;

parse each of the expanded templated fragments of the SQL expression, and determine a syntax tree of the SQL expression from the expanded templated fragments;

analyze the syntax tree of the SQL expression;

create, based on the analysis, a new CO related to the identified CO, the new CO comprising information related to the column name, a templated expression of the SQL expression and the alias, the creation of the new CO comprising:

identifying an unnested SQL fragment associated with the CO;

parsing the unnested SQL fragment into the syntax tree;

analyzing the syntax tree, and identifying aggregation function calls;

translating each identified aggregation function call into a set of inner aggregations;

assigning each inner aggregation function a unique alias;

converting each inner aggregation into another CO;

translating each aggregation function call into a set of outer aggregations;

modifying operands of the syntax tree to reference the unique aliases;

analyzing the modified syntax tree and generating a new native SQL expression;

replacing aliases in the new native SQL expression with the templated expression; and converting the outer aggregations into the new CO;

analyze information related to the new CO, and determine a type of dimension nesting, the type of dimension nesting being based on whether a referenced join is to occur as an inner query or outer query; and perform the determined type of dimension nesting.

16. The device of claim 15, wherein the unnested SQL fragment at least corresponds to the expression of the CO.

17. The device of claim 15, wherein the processor is further configured to:

determine, based on the analysis of the new CO information, that the type of dimension nesting is inner dimension nesting;

identify the new CO;

designate the new CO as an inner query CO; and create a new outer query CO that references the inner query CO.

18. The device of claim 15, wherein the processor is further configured to:

determine, based on the analysis of the new CO information, that the type of dimension nesting is outer dimension nesting, wherein the referenced join is to occur as the outer query;

identify the expression of the new CO;

convert the expression into a reference tree;

analyze the reference tree, and extract physical column references;

group the physical column references;

create a set of new inner query COs for each grouping, each new inner query CO being set to a second templated expression that references a physical column;

generate an outer query expression by at least partially resolving template variables of the second templated expression of the new CO; and create a new outer query CO that includes the outer query expression and the alias.

\* \* \* \* \*